United States Patent
Zhu et al.

(10) Patent No.: US 7,613,756 B1
(45) Date of Patent: Nov. 3, 2009

(54) RANDOM NUMBER GENERATION APPARATUS AND METHOD

(75) Inventors: Xiaojun Zhu, Milpitas, CA (US); Reading G. Maley, San Francisco, CA (US); Sompur M. Shivakumar, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 764 days.

(21) Appl. No.: 11/034,074

(22) Filed: Jan. 11, 2005

(51) Int. Cl.
*G06F 7/58* (2006.01)

(52) U.S. Cl. ..................... 708/250; 708/251

(58) Field of Classification Search .......... 708/250–256
See application file for complete search history.

(56) References Cited

U.S. PATENT DOCUMENTS

| | | | | |
|---|---|---|---|---|
| 4,684,903 A | * | 8/1987 | Hunt et al. | 708/250 |
| 4,697,157 A | * | 9/1987 | Buddecke et al. | 708/250 |
| 5,239,494 A | * | 8/1993 | Golbeck | 708/3 |
| 5,706,218 A | * | 1/1998 | Hoffman | 708/251 |
| 6,061,702 A | * | 5/2000 | Hoffman | 708/251 |
| 7,099,906 B2 | * | 8/2006 | Messina et al. | 708/255 |
| 2002/0042806 A1 | * | 4/2002 | Saito | 708/801 |
| 2003/0093455 A1 | * | 5/2003 | Messina et al. | 708/801 |
| 2003/0208517 A1 | * | 11/2003 | Takagi | 708/251 |
| 2004/0006580 A1 | * | 1/2004 | Miller, Jr. | 708/250 |
| 2005/0027765 A1 | * | 2/2005 | Wells | 708/250 |
| 2006/0218212 A1 | * | 9/2006 | Mattison | 708/251 |

* cited by examiner

*Primary Examiner*—Chat C Do
(74) *Attorney, Agent, or Firm*—Martine Penilla & Gencarella, LLP

(57) ABSTRACT

An apparatus and a method are provided for generating a random number, wherein the randomness of the random number is derived from thermal noise present across a pair of resistors. Each of the pair of resistors is defined to receive a respective input voltage and add a respective noise component to the input voltage. The output from each resistor in the pair of resistors is amplified to generate a noisy analog voltage that includes a representation of the random noise components added by the pair of resistors. The randomly varying noisy analog voltage is used to control a voltage controlled oscillator (VCO). The VCO generates a random digital signal based on the randomly varying noisy analog voltage. The random digital signal generated by the VCO is used to set a number of bits for defining a random number.

19 Claims, 5 Drawing Sheets

RANDOM NUMBER GENERATION APPARATUS AND METHOD

BACKGROUND

Random numbers and their generation play a key role in many modern computing systems and networks. For example, in cryptographic applications for secure networking environments, unique keys are generated and used to provide non-repeatable security authentication codes. It is common for these unique keys to be defined as random numbers having been generated by a random number generation device or method. One type of random number generation method produces pseudo-random numbers or deterministic random numbers. The pseudo-random number generation method involves repeated evaluation of a mathematical formula to generate random numbers. The random numbers generated by evaluation of the mathematical formula are characterized as being pseudo-random because the random numbers generated by successive evaluation of the mathematical formula will eventually repeat in a sequential manner. Therefore, with knowledge of the mathematical formula and appropriate input values, it is possible for the pseudo-random number generation sequence to be reproduced, thus leaving a security weakness that is susceptible to exploitation by a harmful entity.

In view of the foregoing, it is more desirable in certain applications to generate truly random numbers that are based on a source of randomness that is truly random, as opposed to a deterministic mathematical formula. Consequently, a need continually persists for improvements in technology associated with true random number generation.

SUMMARY

It should be appreciated that the present invention can be implemented in numerous ways, such as a process, an apparatus, a system, a device or a method. Several inventive embodiments of the present invention are described below.

In one embodiment, a random number generator circuit is disclosed. The circuit includes a first resistor having an input and an output, wherein the input is connected to receive a first voltage. The first resistor is also defined to add a random noise component to the first voltage. The circuit further includes a second resistor having an input and an output, wherein the input is connected to receive a second voltage. The second resistor is also defined to add a random noise component to the second voltage. Additionally, the circuit includes an amplifier having a first input connected to the output of the first resistor and a second input connected to the output of the second resistor. The amplifier is also defined to have an output for providing a third voltage that includes a representation of the random noise components added by the first and second resistors. The circuit further includes a voltage controlled oscillator (VCO) having an input connected to the output of the amplifier. The VCO is defined to generate a random signal based on the third voltage, wherein the third voltage includes the random noise components added by the first and second resistors. The random signal generated by the VCO is capable of being used to set a bit for defining a random number.

In another embodiment, a random number generator circuit is disclosed. The circuit includes a first channel defined to provide a first random signal having a random frequency and a random phase. The circuit also includes a second channel defined to provide a second random signal having a random frequency and a random phase. The circuit further includes a third channel defined to provide a third random signal having a random frequency and a random phase. Digital logic is also included in the circuit to receive each of the first, second, and third random signals as input, wherein each of the first, second, and third random signals is provided by the first, second, and third channels, respectively. The digital logic is further defined to evaluate an exclusive-nor combination of the first and second random signals to generate a fourth random signal. Additionally, the digital logic is defined to register a value of the fourth random signal in accordance with the third random signal. The registered value of the fourth random signal is used to set a bit for defining a random number.

In another embodiment, a method for generating a random number is disclosed. The method includes an operation for generating a first voltage and a second voltage, wherein each of the first and second voltages have a respective random noise component. The method also includes an operation for generating a noisy analog voltage through amplification of the first and second voltages. The random noise components of the first and second voltages cause the noisy analog voltage to be random. The method further includes an operation for providing the random noisy analog voltage as input to a VCO. Thus, the output of the VCO is a random signal having a random phase and a random frequency. Additionally, the method provides an operation for setting a bit to define a random number based on the random signal output from the VCO.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
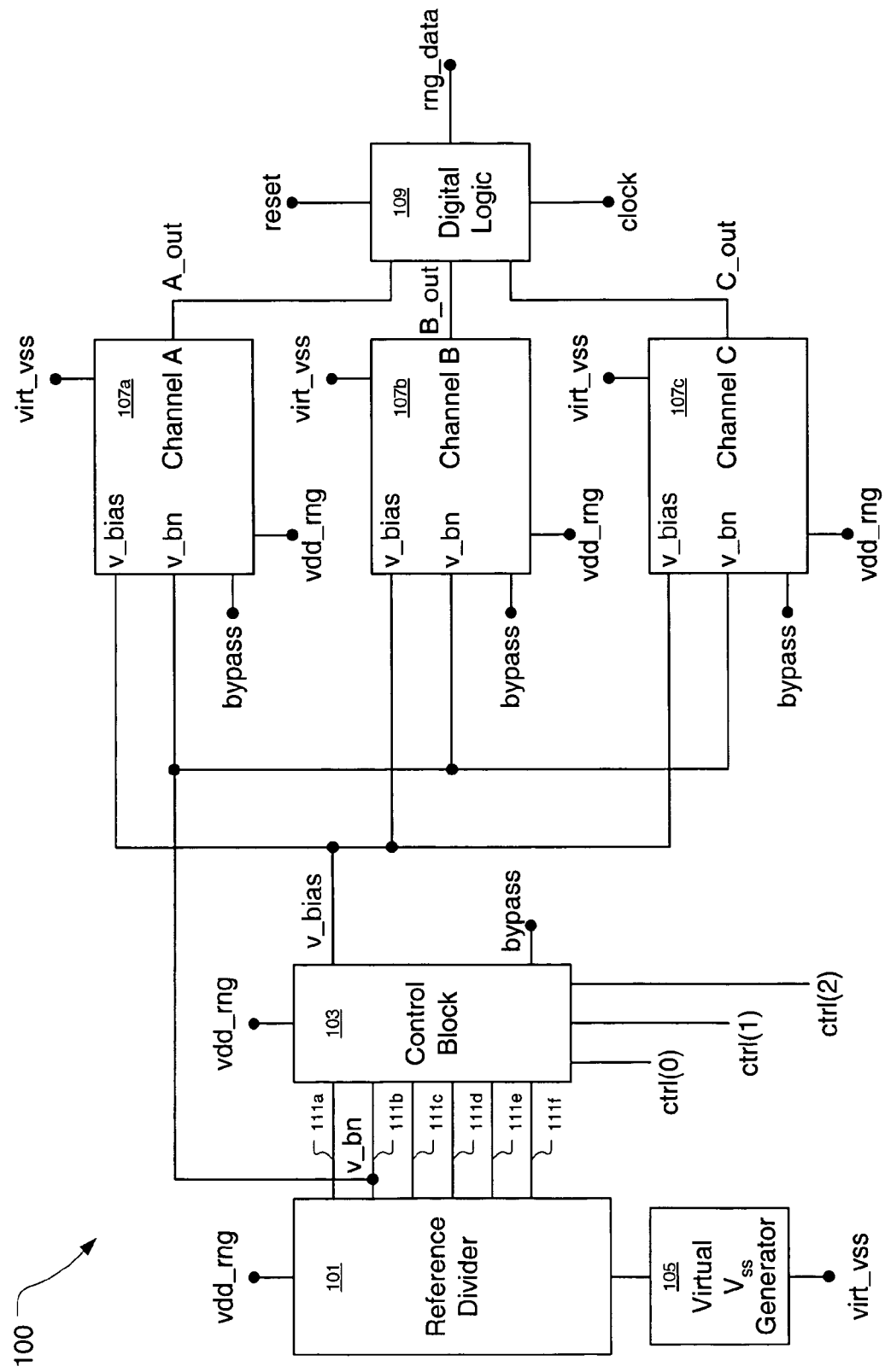
FIG. 1 is an illustration showing a random number generator circuit block diagram, in accordance with one embodiment of the present invention.

FIG. 1 is an illustration showing a random number generator circuit ("RNG 100" hereafter) block diagram, in accordance with one embodiment of the present invention. The RNG 100 is defined to receive a regulated voltage supply ("vdd_rng" hereafter) for powering various components within the RNG 100. In one embodiment, the vdd_rng is provided by a voltage regulator implemented within an integrated circuit environment of the RNG 100. For example, the voltage regulator can be defined to receive a 1.8 V supply and generate a regulated 1.1 V supply to be provided as vdd_rng. Additionally, the voltage regulator can be defined to provide bias currents to various components within the RNG 100. It should be appreciated that the RNG 100 of the present invention can be defined to operate in conjunction with essentially any voltage regulator device capable of providing an appropriate stable bias voltage, i.e., vdd_rng, for powering the various components of the RNG 100.

The RNG 100 also includes a reference divider 101 defined to receive the vdd_rng reference voltage and divide the vdd_rng into a number of different voltages. In one embodiment, the reference divider 101 is implemented as a resistor network including a number of serially connected resistors, wherein one end of the serially connected resistors is connected to receive the vdd_rng. A node exists between each pair of serially connected resistors within the reference divider 101. Each node is capable of providing a particular voltage derived from vdd_rng based on a resistance established between the node and the vdd_rng input to the reference divider 101. Thus, the reference divider 101 provides a number of output connections 111a-111f, wherein each output connection represents a connection to a particular node and associated voltage in the reference divider 101. As will be discussed further below, the various voltages provided by the reference divider 101 can be used to operate the RNG 100 according to a desired operational characteristic. Furthermore, it should be appreciated that the reference divider 101 as discussed herein is provided for exemplary purposes. In other embodiments, the reference divider 101 can be defined to include a different number of resistors and nodes according to particular voltage requirements of the RNG 100, wherein the particular voltage requirements of the RNG 100 can be application-specific.

The RNG 100 also includes a virtual $V_{ss}$ generator ("VVG 105" hereafter) for providing a virtual ground voltage ("virt_vss" hereafter) to be used by various components within the RNG 100. The VVG 105 is defined to receive a voltage reference from the reference divider 101 and output a stable virt_vss. In one embodiment, the VVG 105 receives a 220 mV voltage reference from the reference divider 101 and outputs a stable virt_vss of 120 mV for use by other components within the RNG 100.

The RNG 100 also includes a control block 103. The control block 103 is defined to receive a number of different voltages from the reference divider 101, as indicated by connections 111a-111f. Additionally, the control block 103 is defined to receive a number of input signals. In the embodiment of FIG. 1, the control block 103 is defined to receive three input signals "ctrl(0)", "ctrl(1)", and "ctrl(2)." However, it should be appreciated that in other embodiments, the control block 103 can be defined to receive as many input signals as necessary to accommodate a particular number of available control options. In the embodiment of FIG. 1, three input signals are sufficient to provide for selection of one of connections 111a-111f to provide a bias voltage or for selection of a bypass option. Selection of the bypass option serves to disable the RNG 100. The selected connection 111a-111f serves to define a bias voltage ("v_bias" hereafter) to be output to each of a number of random number generation channels within the RNG 100. As will be discussed in more detail below, the v_bias setting serves to establish a base frequency of a random signal to be used in generating the random number data to be output by the RNG 100. Additionally, it should be appreciated that the control block 103 is connected to receive vdd_rng for biasing substrate diodes and powering various components within the control block 103, e.g., operational amplifiers.

The RNG 100 further includes a number of random number generation channels. In the exemplary embodiment of FIG. 1, the RNG 100 includes three random number generation channels identified as "Channel A 107a", "Channel B 107b", "Channel C 107c." Each of channels 107a-107c is identical. Each of channel 107a-107c is connected to receive as inputs, v_bias and bypass from the control block 103. Also, each of channels 107a-107c is connected to receive as inputs, vdd_rng and virt_vss. Each of channels 107a-107c is also connected to receive another bias voltage ("v_bn" hereafter) from either of connections 111a-111f. For exemplary purposes, the v_bn in FIG. 1 is shown to be obtained from connection 111b. Utilization of the various inputs (v_bias, v_bn, bypass, vdd_rng, and virt_vss) by each of channels 107a-107c is further described below with respect to FIG. 2.

Each of channels 107a-107c is defined to provide an output signal ("A_out", "B_out", and "C_out", respectively), wherein each output signal represents a digital signal having a randomly varying frequency and a randomly varying phase. Generally speaking, each of channels 107a-107c is defined to amplify thermal noise across a pair of resistors to generate a common mode voltage. The common mode voltage is used to control a voltage controlled oscillator (VCO) which produces a corresponding digital output signal, i.e., A_out, B_out, C_out. It should be appreciated that since the thermal noise across the pair of resistors varies randomly, the common mode voltage used to control the VCO will also vary randomly. Thus, the digital output signal generated by the VCO will also vary randomly in both frequency and phase. Therefore, although each channel 107a-107c is identical and receives identical inputs, the digital output signals A_out, B_out, and C_out are completely independent of one another.

The RNG 100 further includes digital logic 109. As input, the digital logic 109 is defined to receive each of the outputs A_out, B_out, and C_out from the channels 107a-107c, respectively. Also, the digital logic 109 is defined to receive a clock signal as input, wherein the clock signal is associated with circuitry on the chip that is both external to the RNG 100 and connected to receive output from the RNG 100. The digital logic 109 is also defined to receive a reset signal for resetting the digital logic 109 to a default state. The digital logic 109 is further defined to provide output data representing a random number ("rng_data" hereafter).

Figure 5:
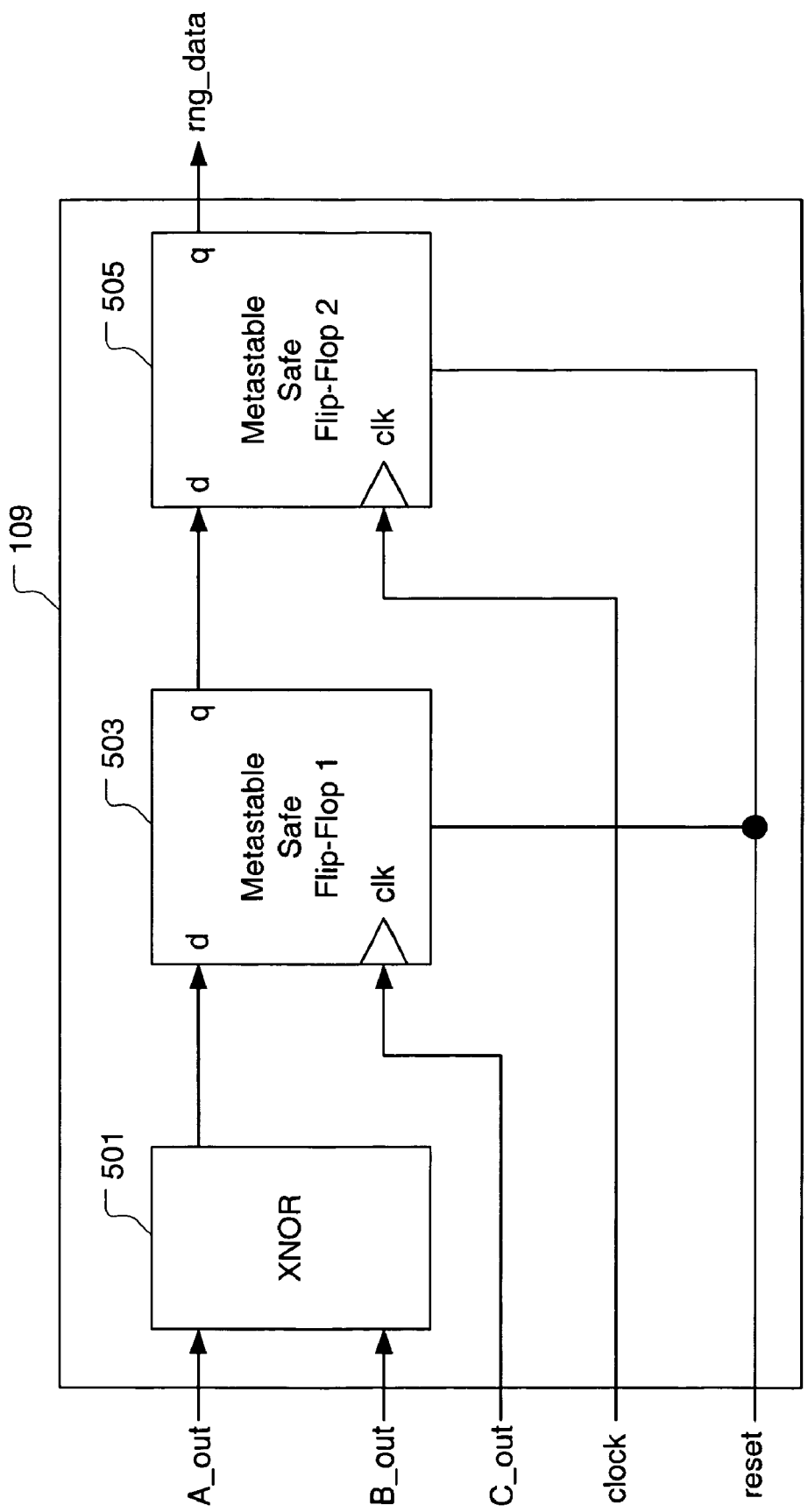
FIG. 5 is an illustration showing a more detailed view of the digital logic, in accordance with one embodiment of the present invention.

FIG. 5 is an illustration showing a more detailed view of the digital logic 109, in accordance with one embodiment of the present invention. The digital logic 109 is defined to direct two of the received channel outputs to an XNOR gate 501. For example, in the embodiment of FIG. 5 the digital logic 109 is defined to direct A_out and B_out, as received from channels 107a and 107b, respectively, to the XNOR gate 501. The output of the XNOR gate 501 is then registered by a first metastable safe flip-flop 503. The digital logic 109 of the exemplary embodiment is defined to use the C_out signal, as received from channel 107c, as a random clock input signal to the first metastable safe flip-flop 503. Since channel outputs A_out, B_out, and C_out have random phase and frequency, the value registered by the first metastable safe flip-flop 503 will represent a random signal having a random phase and random frequency. Use of the XNOR gate 501 ensures that any unforeseen dependencies between the channel outputs A_out and B_out is negated in the random signal registered by the first metastable safe flip-flop 503.

The digital logic 109 further includes a second metastable safe flip-flop 505 connected to receive as an input, the output of the first metastable safe flip-flop 503. The second metastable safe flip-flop 505 is further connected to receive an input clock signal from circuitry external to the RNG 100. An output of the second metastable safe flip-flop 505 is provided as the output of the digital logic 109. The output of the digital logic 109 can be used to set a number of bits for defining a digital representation of a random number represented as rng_data. Thus, the second metastable safe flip-flop 505 enables the random signal output from the first metastable safe flip-flop 503 to be synchronized with the clock signal from the circuitry external to the RNG 100, such that rng_data is available when needed by the circuitry that interfaces with the RNG 100.

Figure 2:
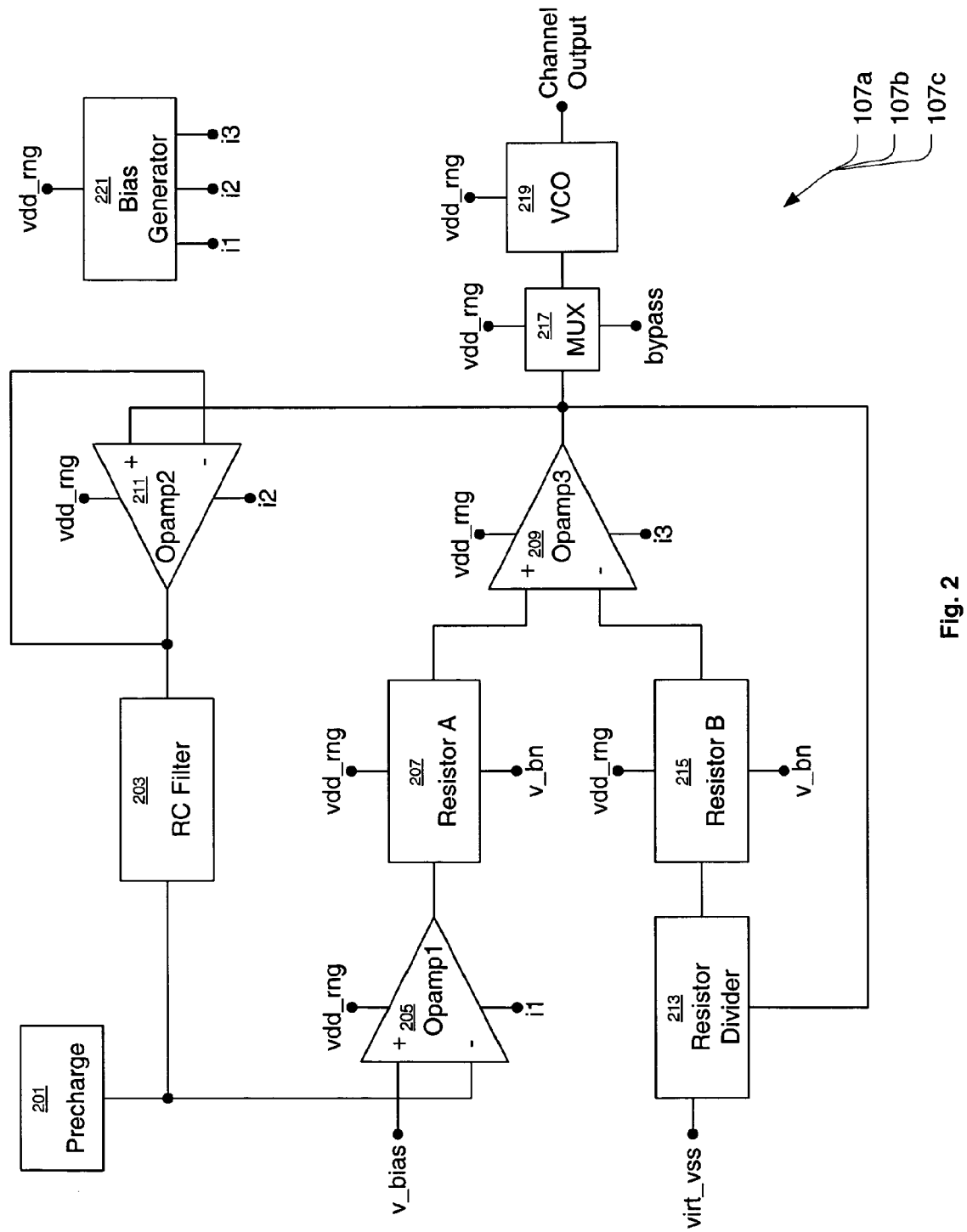
FIG. 2 is an illustration showing a circuit block diagram corresponding to each channel, in accordance with one embodiment of the present invention.

As indicated by the previous discussion, the channels 107a-107c represent a core of the RNG 100. FIG. 2 is an illustration showing a circuit block diagram corresponding to each of channels 107a-107c, in accordance with one embodiment of the present invention. It should be appreciated that since each of channels 107a-107c is defined in an identical manner, the circuit block diagram of FIG. 2 is equally descriptive of each of channels 107a-107c.

With respect to FIG. 2, a bias generator 221 is defined to receive power from vdd_rng and generate bias currents i1, i2, and i3 for use by operational amplifiers present within the channel. In one embodiment, the bias generator 221 is defined as an integral component of the channel. In another embodiment, the bias generator 221 can be defined external to the channel.

The channel input for receiving v_bias is connected to a positive input of a first operational amplifier ("Opamp1 205" hereafter). Opamp1 205 is defined to receive power from vdd_rng and the bias current i1 from the bias generator 221. An output of Opamp1 205 is connected to an input of a resistor ("Resistor A 207" hereafter). As will be discussed in more detail with respect to FIG. 3, the Resistor A 207 is connected to receive the reference voltage vdd_rng and the bias voltage v_bn. An output of Resistor A 207 is connected to a positive input of an operational amplifier ("Opamp3 209" hereafter). Opamp3 209 is defined to receive power from vdd_rng and the bias current i3 from the bias generator 221. An output of Opamp3 209 is connected to a positive input of an operational amplifier ("Opamp2 211" hereafter). Opamp2 211 is defined to receive power from vdd_rng and the bias current i2 from the bias generator 221. Opamp2 211 is connected to function as a buffer. Thus, an output of Opamp2 211 is connected to a negative input of the Opamp2 211. The output of Opamp2 211 is also connected to a resistance/capacitance filter ("RC Filter 203" hereafter). An output of the RC Filter 203 is connected to a negative input of Opamp1 205.

Further with respect to FIG. 2, the channel input for receiving virt_vss is connected to a ground end of a resistor divider 213. The resistor divider 213 is connected to an input of a resistor ("Resistor B 215" hereafter). As will be discussed with respect to FIG. 3, the Resistor B 215 is connected to receive the reference voltage vdd_rng and the bias voltage v_bn. An output of Resistor B 215 is connected to a negative input of Opamp3 209. It should be appreciated that Resistor A 207 and Resistor B 215 are defined in an identical manner, but have uncorrelated time domain noise characteristics.

The output of Opamp3 209 is also connected to an input of a multiplexer ("MUX 217" hereafter). The MUX 217 is powered by vdd_rng. Also, the MUX 217 is connected to receive the bypass signal provided as input to the channel. If the bypass signal is not set to activate a bypass function, the MUX 217 operates to pass the signal received from Opamp 3 209 through to an output of the MUX 217. However, if the bypass function is activated, the MUX 217 will prevent the output of Opamp3 209 from passing through to the output of the MUX 217. The output of the MUX 217 is connected to an input of a VCO 219. An output of the VCO 219 is connected to provide the output of the channel, i.e., A_out, B_out, C_out.

Opamp3 209 functions to output a single ended noisy analog voltage based on its inputs received from Resistor A 207 and Resistor B 215. The outputs provided by each of Resistor A 207 and Resistor B 215 to Opamp 3 209 includes a direct current (DC) component and an alternating current (AC) component. Thus, the noisy analog voltage output from Opamp3 209 includes both DC and AC components. The DC component of the noisy analog voltage is set by v_bias as input to Opamp1 205. The AC component of the noisy analog voltage is set by random thermal noise introduced by Resistor A and Resistor B. The random thermal noise appears as white noise across each of Resistor A 207 and Resistor B 215. The random thermal noise provided by Resistor A 207 and Resistor B 215 causes the single ended noisy analog voltage output from Opamp3 209 to vary randomly about v_bias. Thus, the VCO 219 will operate in accordance with the randomly varying noisy analog voltage output from Opamp3 209. Consequently, the output of the VCO 219 will be a digital signal that varies randomly in both phase and frequency.

It should be appreciated that a gain curve of the VCO 219 can be consulted to determine a magnitude of variation in input voltage to the VCO 219 that is required to obtain a particular magnitude of frequency variation in the output from the VCO 219. Thus, based on examination of the gain curve of the VCO 219, required noise characteristics of the Resistor A 207 and the Resistor B 215 can be determined. It should be further appreciated that the gain curve of the VCO 219 can be consulted to determine a magnitude of the DC component voltage necessary to establish a base frequency about which the VCO 219 output frequency will vary. Once the DC component is determined, an appropriate v_bias can be selected from reference divider 101 via the control block 103 by appropriately setting the control inputs ctrl(0)-(2).

The channel as shown in FIG. 2 is defined to have a negative feedback loop and a positive feedback loop for stabilizing the voltage output from Opamp3 209. In addition to Opamp3 209, the negative feedback loop includes Opamp2 211, RC Filter 203, Opamp1 205, and Resistor A 207. In addition to Opamp3 209, the positive feedback loop includes resistor divider 213 and Resistor B 215. The negative and positive feedback loops are designed to bias the inputs to each of Resistor A 207 and Resistor B 215, such that the desired bias voltage is output from Opamp 3 209. Also, it should be understood that the DC bias voltage of the negative and positive feedback loops is established by v_bias, as supplied to Opamp1 205. For example, if v_bias as supplied to Opamp1 205 is 400 mV, the negative feedback loop will function to get the negative input to Opamp 1 205 to about 400 mV. Thus, in the above example, the RC Filter 203 output will be about 400 mV. The RC Filter 203 is a passive filter with essentially no through-flowing current. Therefore, the input to the RC Filter 203 in the above example is also about 400 mV. Thus, the DC component of the output of Opamp3 209 is also about 400 mV. Hence, the v_bias input serves to establish the DC component of the Opamp3 209 output.

The RC Filter 203 serves to provide a phase margin for the negative feedback loop, such that the negative feedback loop is stable across all operating conditions. To this effect, the RC Filter 203 functions to filter AC component noise introduced by the Resistor A 207 and the Resistor B 215 on the output of Opamp3 209. Thus, the RC Filter 203 serves to maintain stability of the negative feedback loop. Additionally, a precharge block 201 can be connected to the negative feedback loop to provide a precharge of the negative feedback loop during startup. In one embodiment, the precharge block 201 is connected to the negative feedback loop at the output of the RC Filter 203.

Figure 3:
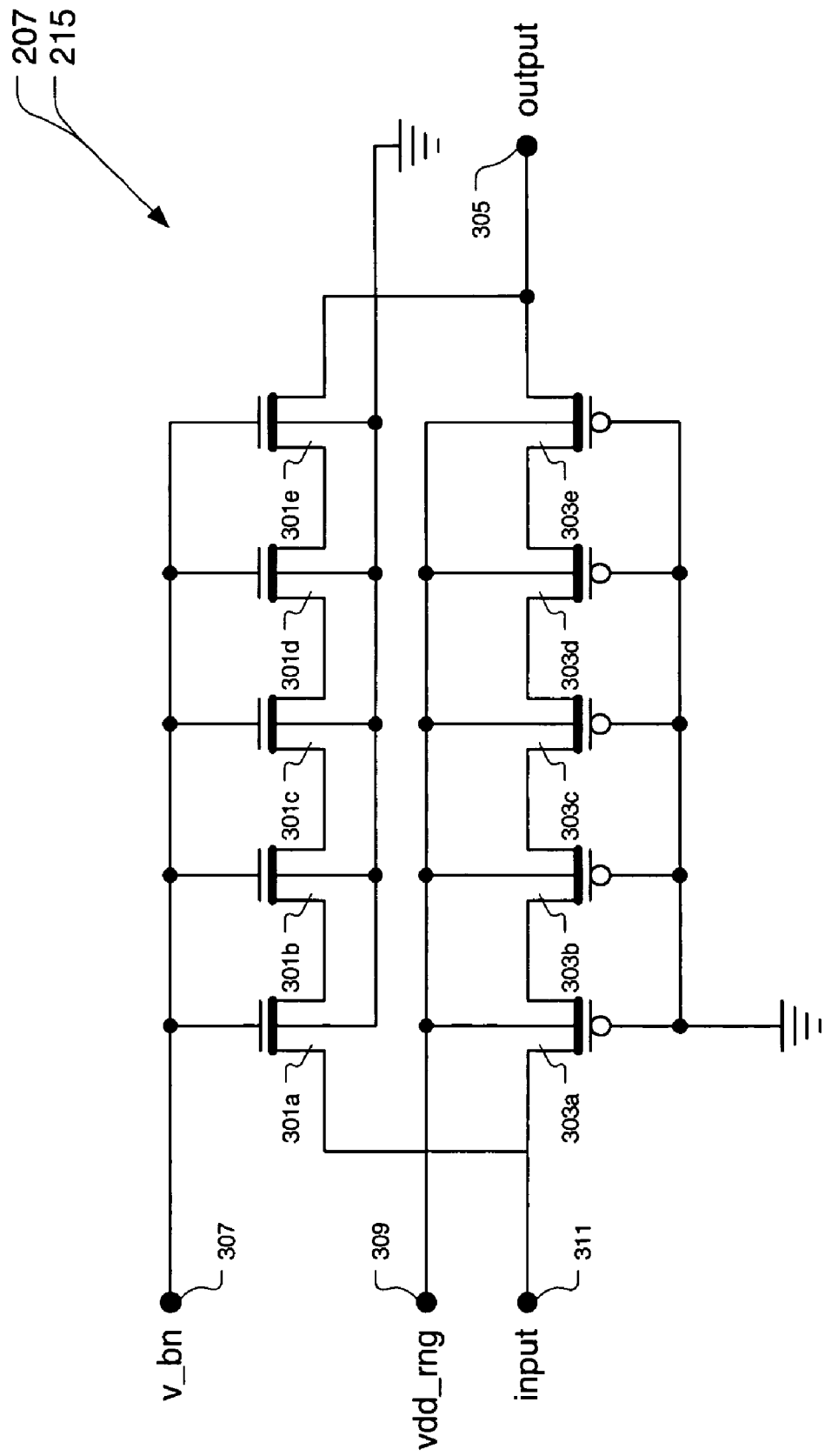
FIG. 3 is an illustration showing an electrically controllable resistor, in accordance with one embodiment of the present invention.

As discussed above, the Resistor A 207 and the Resistor B 215 are important components in each channel 107a-107c of the RNG 100. FIG. 3 is an illustration showing an electrically controllable resistor (ECR), in accordance with one embodiment of the present invention. Each of Resistor A 207 and Resistor B 215 can be implemented as the ECR shown in FIG. 3. The ECR is effectively defined as a series of pass gates. The series of pass gates includes a number of NMOS transistors 301a-301e connected in series and a number of PMOS transistors 303a-303e connected in series, wherein the NMOS transistors 301a-301e are connected in parallel to the PMOS transistors 303a-303e. Each of the NMOS transistors 301a-301e has its gate connected to the controllable bias voltage v_bn, as indicated by node 307. As previously discussed with respect to FIG. 1, the bias voltage v_bn can be obtained from either output connection 111a-111f of the reference divider 101, as appropriate to establish the desired v_bn voltage setting. Adjustment of the v_bn voltage serves to modify a resistance of the ECR, thus providing the electrically controllable characteristic of the ECR. Additionally, the substrate of each NMOS transistor 301a-301e is connected to ground.

The vdd_rng supply voltage is connected to the substrate of each PMOS transistor 303a-303e, as indicated by node 309. The vdd_rng connection to node 309 serves to bias the substrate of each PMOS transistor 303a-303e, such that the source and drain diodes are reverse biased. The ECR is also defined to receive an input voltage and provide an output voltage, as indicated by nodes 311 and 305, respectively. With the ECR implemented as Resistor A 207, the input node 311 is connected to the output of Opamp1 205, and the output node 305 is connected to the positive input of Opamp3 209. With the ECR implemented as Resistor B 215, the input node 311 is connected to the output of resistor divider 213, and the output node 305 is connected to the negative input of Opamp3 209.

In one embodiment, the ECR of FIG. 3 can be implemented in a CMOS process using long-channel thick-oxide pass gates. It should be appreciated, that the ECR as implemented in the CMOS process requires less chip area than a conventional resistor. Also, the ECR as implemented in the CMOS process provides higher resistance per unit chip area as compared to a conventional resistor. However, it should be understood that each of the Resistor A 207 and the Resistor B 215 in the present invention can be implemented using either the ECR as previously discussed or conventional resistors.

With respect to FIGS. 1-3 and the associated discussion provided above, the RNG 100 can be described as including a first resistor (Resistor A 207) having an input and an output. The input of the first resistor (Resistor A 207) is connected to receive a first voltage, i.e., output of Opamp1 205. The first resistor (Resistor A 207) is defined to add a random noise component, i.e., AC component, to the first voltage. In one embodiment, the first voltage is defined as a stable bias voltage based on v_bias. The RNG 100 also includes a second resistor (Resistor B 215) having an input and an output. The input of the second resistor (Resistor B 215) is connected to receive a second voltage, i.e., output of Resistor Divider 213. In one embodiment, the second voltage is defined as virtual ground voltage based on virt_vss. Similar to the first resistor (Resistor A 207), the second resistor (Resistor B 215) is defined to add a random noise component, i.e., AC component, to the second voltage.

The RNG 100 further includes an amplifier (Opamp3 209) having a first input, i.e., positive input, connected to the output of the first resistor (Resistor A 207). The amplifier also includes a second input, i.e., negative input, connected to the output of the second resistor (Resistor B 215). The amplifier (Opamp3 209) is defined to have an output for providing a third voltage. The third voltage includes a representation of the random noise components, i.e., AC components, added by the first and second resistors (Resistors A 207 and B 215, respectively). The third voltage can be further described as representing a noisy analog voltage based on the first and second voltages input to the amplifier (Opamp3 209).

Additionally, the RNG 100 includes a VCO (VCO 219) that has an input connected to the output of the amplifier (Opamp3 209 via MUX 217). The VCO (VCO 219) is defined to generate a digital signal being random in frequency and phase, based on the third voltage, i.e., output of Opamp3 209, that includes the random noise components added by the first and second resistors (Resistors A 207 and B 215, respectively). The random digital signal to be generated by the VCO (VCO 219) is capable of being used to set a bit for defining a random number to be output by the RNG 100.

Furthermore, with respect to FIGS. 1-3 and the associated discussion provided above, the RNG 100 can also be described as including a first channel (Channel A 107a) defined to provide a first random signal (A_out) having a random frequency and a random phase. The RNG 100 also includes a second channel (Channel B 107b) defined to provide a second random signal (B_out) having a random frequency and a random phase. The RNG 100 further includes a third channel (Channel C 107c) defined to provide a third random signal (C_out) having a random frequency and a random phase. Additionally, digital logic is defined to receive each of the first, second, and third random signals (A_out, B_out, and C_out, respectively) as inputs. The digital logic is defined to evaluate an exclusive-nor (XNOR) combination of the first and second random signals (A_out and B_out) to generate a fourth random signal. The digital logic is further defined to register a value of the fourth random signal in accordance with the third random signal (C_out). The registered value of the fourth random signal can be used to set a bit for defining a random number.

Figure 4:
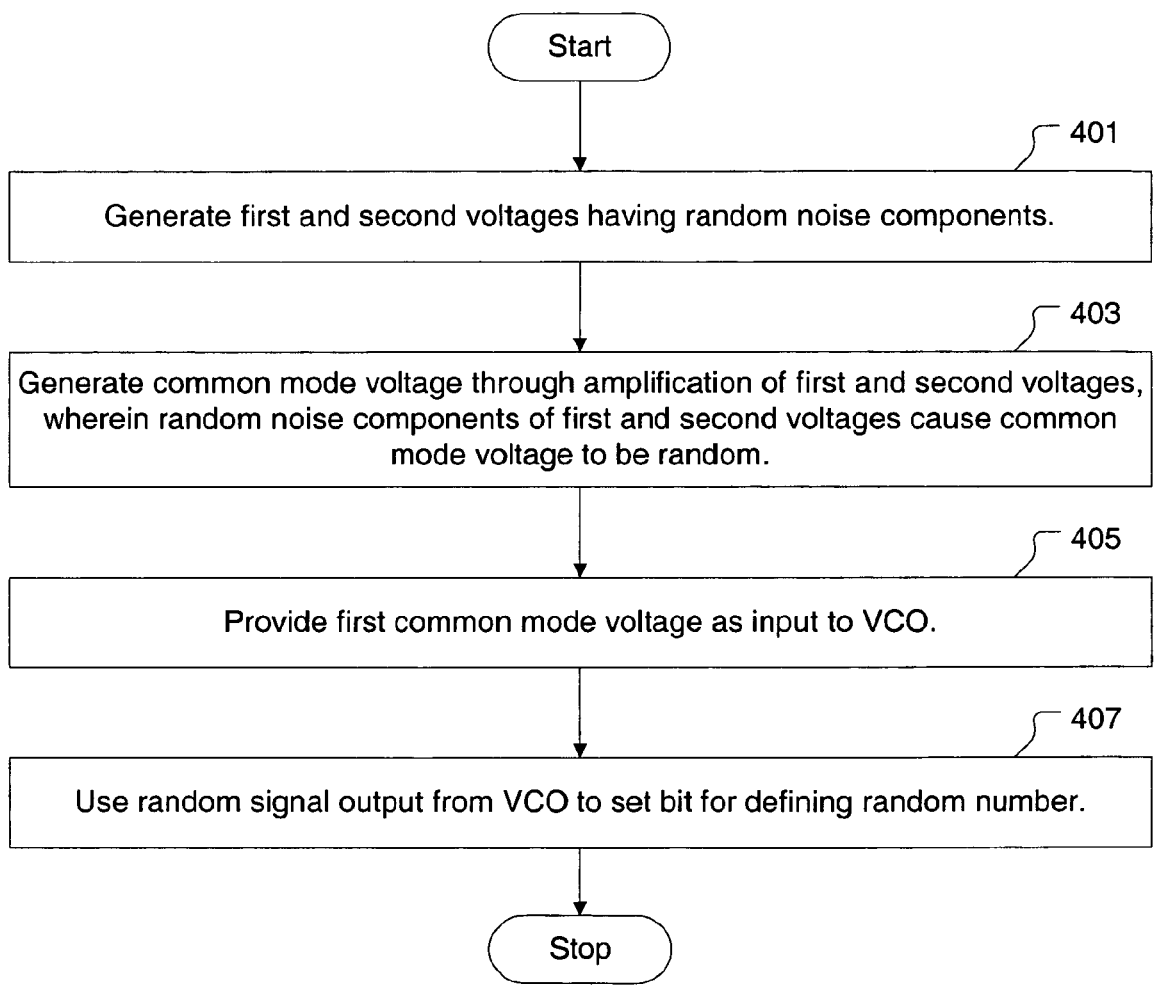
FIG. 4 is an illustration showing a flowchart of a method for generating a random number, in accordance with one embodiment of the present invention.

FIG. 4 is an illustration showing a flowchart of a method for generating a random number, in accordance with one embodiment of the present invention. The method includes an operation 401 for generating a first voltage having a random noise component and a second voltage having a random noise component. In an operation 403, a first noisy analog voltage is generated through amplification of the first and second voltages. The random noise components of the first and second voltages cause the first noisy analog voltage to be random. In one embodiment, the first noisy analog voltage is stabilized through use of a negative feedback loop for controlling the first voltage and a positive feedback loop for controlling the second voltage. It should be understood, however, that stabilization of the first noisy analog voltage does not eliminate the random nature of the first noisy analog voltage. Rather, the stabilization causes the first noisy analog voltage to vary randomly about a stable voltage setting. In an operation 405, the method includes providing the first noisy analog voltage as input to a VCO. Since the first noisy analog voltage varies randomly, an output of the VCO will be a random digital signal having a random phase and a random frequency. The method also includes an operation 407 for setting a bit for defining a random number based on the random digital signal output from the VCO.

In one embodiment of the method, the first voltage is generated to establish the base frequency of the random digital signal output from the VCO, based on a gain function of the VCO. The random digital signal output from the VCO will vary randomly in frequency about the base frequency. Additionally, the base frequency of the random digital signal output from the VCO can be controlled by controlling the first voltage. Also, in one embodiment of the method, the second voltage is established based on a virtual ground voltage.

In another embodiment, the method of FIG. 4 can further include an operation for generating a second noisy analog voltage through amplification of the first and second voltages. The random noise components of the first and second voltages cause the second generated noisy analog voltage to be random. In the present embodiment, the method also includes an operation for generating a third noisy analog voltage through amplification of the first and second voltages. Again, the random noise components of the first and second voltages cause the third generated noisy analog voltage to be random. Another operation of the present embodiment provides the second and third noisy analog voltages as input to a respective VCO. The output of each respective VCO is a second and third random digital signal having a random phase and a random frequency. Further in the present embodiment, an operation is provided for generating a fourth random digital signal representing an exclusive-nor combination of the first and second VCO outputs. An operation is then provided for registering a value of the fourth random digital signal in accordance with the third VCO output. The registered value of the fourth random digital signal is used to set the bit for defining the random number.

By using the thermal noise across a pair of resistors as a source of random variation, the random number generator of the present invention (RNG 100) is capable of generating truly random numbers. Also, by using the VCO, rather than another component such as an analog-to-digital converter (ADC), the random number generator of the present invention is capable of providing random number data output at a high bit rate. For example, in some applications it is anticipated that the random number generator of the present invention will be capable of providing random number data output at speeds in excess of a few GHz. Additionally, use of the VCO, as compared to another component such as an ADC, allows the random number generator of the present invention to occupy a smaller chip area. In conjunction with occupying the smaller chip area, the random number generator of the present invention will also consume less power.

The random number generator of the present invention can be used to generate truly random numbers for use in essentially any application where truly random numbers are required. In one example application, the random number generator of the present invention can be used to generate cryptographic keys. In another example application, the random number generator of the present invention can be used to generate test vectors for integrated circuit testing. It should be appreciated, however, that the applicability of the random number generator of the present invention can extend well beyond the two example applications noted above.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A random number generator circuit, comprising:
   a first resistor having an input and an output, the input being connected to receive a first voltage, the first resistor being defined to add a random noise component to the first voltage;
   a second resistor having an input and an output, the input being connected to receive a second voltage, the second resistor being defined to add a random noise component to the second voltage;
   an amplifier having a first input connected to the output of the first resistor and a second input connected to the output of the second resistor, the amplifier being defined to have an output for providing a third voltage that includes a representation of the random noise components added by the first and second resistors;
   a negative feedback loop defined to control the first voltage to stabilize the third voltage to be output by the amplifier;
   a positive feedback loop defined to control the second voltage to further stabilize the third voltage to be output by the amplifier; and
   a voltage controlled oscillator (VCO) having an input connected to the output of the amplifier, the VCO being defined to generate a random signal based on the third voltage that includes the random noise components added by the first and second resistors, the random signal used to set a bit for defining a random number.

2. The random number generator circuit as recited in claim 1, wherein the first voltage is defined as a stable bias voltage and the second voltage is defined as a virtual ground voltage.

3. The random number generator circuit as recited in claim 1, wherein the third voltage represents a noisy analog voltage based on the first and second voltages.

4. The random number generator circuit as recited in claim 1, wherein each of the first and second resistors is respectively defined as a series of pass gates, the series of pass gates including a number of NMOS transistors connected in series and a number of PMOS transistors connected in series, wherein the number of NMOS transistors connected in series is parallel to the number of PMOS transistors connected in series.

5. The random number generator circuit as recited in claim 4, wherein each of the number of NMOS transistors have a gate electrically connected to a controllable bias voltage, the controllable bias voltage capable of being adjusted to affect a resistance provided by each of the first and second resistors.

6. The random number generator circuit as recited in claim 1,
wherein the negative feedback loop includes,
a buffer having an input and an output, the input of the buffer being connected to the output of the amplifier,
a filter having an input and an output, the input of the filter being connected to the output of the buffer, and
an operational amplifier having a pair of inputs and an output, a first input of the pair of inputs of the operational amplifier being connected to receive a stable bias voltage, a second input of the pair of inputs of the operational amplifier being connected to the output of the filter, the output of the operational amplifier being connected to the input of the first resistor.

7. The random number generator circuit as recited in claim 1,
wherein the positive feedback loop includes a resistor divider having an input and an output, the input of the resistor divider being connected to the output of the amplifier, the output of the resistor divider being connected to the input of the second resistor, the resistor divider being configured to supply a virtual stable ground voltage as the second voltage to the input of the second resistor.

8. A random number generator circuit, comprising:
a first channel defined to provide a first random signal having a random frequency and a random phase;
a second channel defined to provide a second random signal having a random frequency and a random phase;
a third channel defined to provide a third random signal having a random frequency and a random phase; and
digital logic defined to receive as input each of the first, second, and third random signals respectively provided by the first, second, and third channels, the digital logic being further defined to evaluate an exclusive-nor combination of the first and second random signals to generate a fourth random signal, the digital logic being further defined to register a value of the fourth random signal in accordance with the third random signal, the registered value of the fourth random signal being used to set a bit for defining a random number.

9. The random number generator circuit as recited in claim 8, wherein each of the first, second, and third channel includes the following,
a first resistor having an input and an output, the input being connected to receive a first voltage, the first resistor being defined to add a random noise component to the first voltage;
a second resistor having an input and an output, the input being connected to receive a second voltage, the second resistor being defined to add a random noise component to the second voltage;
an amplifier having a first input connected to the output of the first resistor and a second input connected to the output of the second resistor, the amplifier being defined to have an output for providing a third voltage that includes a representation of the random noise components added by the first and second resistors; and
a voltage controlled oscillator (VCO) having an input connected to the output of the amplifier, the VCO being defined to generate a random signal based on the third voltage that includes the random noise components added by the first and second resistors, the random signal capable of being used to randomly set a bit for defining a random number.

10. The random number generator circuit as recited in claim 9, wherein each of first and second voltages represents a direct current voltage, and the random noise components added to the first and second voltages represent a randomly varying alternating current voltage.

11. The random number generator circuit as recited in claim 9, wherein each of the first and second resistors is respectively defined as a series of pass gates, the series of pass gates including a number of NMOS transistors connected in series and a number of PMOS transistors connected in series, wherein the number of NMOS transistors connected in series is parallel to the number of PMOS transistors connected in series.

12. The random number generator circuit as recited in claim 9, wherein each of the number of NMOS transistors have a gate electrically connected to a controllable bias voltage, the controllable bias voltage capable of being adjusted to affect a resistance provided by each of the first and second resistors.

13. The random number generator circuit as recited in claim 9, wherein the first voltage is defined as a stable bias voltage and the second voltage is defined as a virtual ground voltage.

14. The random number generator circuit as recited in claim 9, wherein the third voltage represents a noisy analog voltage based on the first and second voltages.

15. A method for generating a random number, comprising:
generating a first voltage having a random noise component;
generating a second voltage having a random noise component;
generating a first noisy analog voltage through amplification of the first and second voltages, the random noise components of the first and second voltages causing the first noisy analog voltage to be random;
stabilizing the first noisy analog voltage through use of a negative feedback loop for controlling the first voltage and a positive feedback loop for controlling the second voltage;
providing the first noisy analog voltage as input to a voltage controlled oscillator (VCO), the output of the VCO being a random signal having a random phase and a random frequency; and
setting a bit for defining a random number based on the random signal output from the VCO.

16. The method for generating a random number as recited in claim 15, further comprising:

controlling a base frequency of the random signal output from the VCO, the random signal output from the VCO varying randomly in frequency about the base frequency.

17. The method for generating a random number as recited in claim 16, wherein the first voltage is generated to establish the base frequency of the random signal output from the VCO based on a gain function of the VCO.

18. The method for generating a random number as recited in claim 15, wherein the second voltage is established based on a virtual ground.

19. The method for generating a random number as recited in claim 15, further comprising:

generating a second noisy analog voltage through amplification of the first and second voltages, the random noise components of the first and second voltages causing the second generated noisy analog voltage to be random;

generating a third noisy analog voltage through amplification of the first and second voltages, the random noise components of the first and second voltages causing the third generated noisy analog voltage to be random;

providing the second and third noisy analog voltages as input to a respective VCO, the output of each respective VCO being a second and third random signal having a random phase and a random frequency;

generating a fourth random signal representing an exclusive-or combination of the first and second VCO outputs; and capturing a value of the fourth random signal in accordance with the third VCO output, the captured value of the fourth random signal being used to set the bit for defining the random number.

* * * * *